(12) United States Patent
Burns

(10) Patent No.: US 7,283,623 B2
(45) Date of Patent: Oct. 16, 2007

(54) INTERNET BROWSING USING A UNIFORM INTERFACE

(75) Inventor: Kary K. Burns, Draper, UT (US)

(73) Assignee: Intellisync Corporation, San Jose, CA (US)

( * ) Notice: Subject to any disclaimer, the term of this patent is extended or adjusted under 35 U.S.C. 154(b) by 499 days.

(21) Appl. No.: 09/735,443

(22) Filed: Dec. 12, 2000

(65) Prior Publication Data

US 2002/0071545 A1    Jun. 13, 2002

(51) Int. Cl.
*H04M 11/00* (2006.01)

(52) U.S. Cl. .............................. 379/93.15; 379/93.09; 379/360

(58) Field of Classification Search ................ 379/368, 379/433.06, 433.07, 88.17, 67.1, 88.13, 93.09, 379/93.15, 93.26, 360; 455/414.1–414.4, 455/566

See application file for complete search history.

(56) References Cited

U.S. PATENT DOCUMENTS 5,790,652 A * 8/1998 Gulley et al. ............... 379/368
5,815,153 A * 9/1998 Isensee et al. ............... 715/764
6,157,841 A * 12/2000 Bolduc et al. ............. 455/456.5
6,456,699 B1 * 9/2002 Burg et al. .............. 379/88.17

* cited by examiner

*Primary Examiner*—Curtis Kuntz
*Assistant Examiner*—Alexander Jamal
(74) *Attorney, Agent, or Firm*—Alston & Bird LLP

(57) ABSTRACT

A system and method for providing a uniform interface on heterogeneous access devices, that are capable of requesting specified classes of information from a server. Access devices, such as those that access Internet content, are often of different hardware and software configurations. Each access device displays a similar interface, for example, an interface similar to the touchpad of a telephone. The interfaces are configured so that similar keys included in the interfaces of different access devices request a similar specified classes of information. Then, when similar keys on different access devices are selected by a user, the selection causes the access devices to request a similar specified class of information. Thus, users of access devices with differing configurations become accustomed to similar keys requesting similar specified classes of information. This makes the interface easier to learn and less confusing for users.

25 Claims, 4 Drawing Sheets

INTERNET BROWSING USING A UNIFORM INTERFACE

BACKGROUND OF THE INVENTION

1. The Field of the Invention

This invention relates to accessing information from the Internet. In particular, the present invention relates to accessing specified classes of information using an input device and an associated user interface that uses a numeric touchpad metaphor.

2. Description of Related Art

The popularity of the Internet has profoundly improved the way people communicate by allowing users quick and easy access to information. By accessing the World Wide Web and electronic mail through computers and other devices, people now stay in touch with each other around the globe, and can access information on a virtually limitless variety of subjects.

Current methods for accessing information on the World Wide Web typically use a software program called a web browser that runs on a personal computer. Current commercial embodiments of web browser software include products such as Microsoft Internet Explorer and Netscape Navigator. During normal operation of web browsing software, a personal computer user uses a keyboard and mouse to retrieve data from the World Wide Web by manually entering a uniform resource identifier (URI) or by following links from one Web page to another. Other commercial embodiments of methods for World Wide Web access use computer software programmed into special purpose devices used specifically for accessing the World Wide Web, but which lack the general processing power of a personal computer. There are also commercial embodiments of methods for accessing World Wide Web data using display devices associated with wireless devices such as cell phones and pagers.

When considering the methods singly, most methods allow computer users to use the components of a system they are familiar with, such as a personal computer or cell phone, to access World Wide Web information. To achieve simple and flexible access to World Wide Web information, software vendors have created Internet browsers for a variety of computer operating systems such as Windows 98, Macintosh and Unix. In addition, many vendors have developed specialized software to run on World Wide Web access devices and wireless devices.

However, due to the multiplicity of software and devices, users are often forced to use multiple devices to access World Wide Web data at different times. For instance, an a user might want to access the World Wide Web in a car and at home but can not transport his home computer in the car. As a result, the user uses a wireless device, having an interface different from his home computer, when traveling in the vehicle. Not only does the physical arrangement of the home computer and wireless device differ but the access software they run differs as well. Thus, the user is forced to learn two different hardware configurations and two different configurations of access software.

While using a variety of different methods to access World Wide Web information is often satisfactory, the time required to become efficient using different methods is sometimes burdensome to the user. First, accessing the World Wide Web using different devices and access software burdens users by requiring them to learn more then one method to access the World Wide Web. This includes requiring the user to learn the individual characteristics of each method before the user can retrieve World Wide Web information. Second, once a user learns multiple methods, identical keys or icons used by different systems can have different meanings, which confuse the user. Third, the user may want access to World Wide Web data in a uniform format when using various access devices. However, methods using different devices may not be capable of doing this, which also confuses the user.

SUMMARY OF THE INVENTION

The present invention relates to a uniform user interface for providing access to various types of Internet content. The interface is capable of being used on access devices, which have differing hardware and software configurations. The interface uses a numeric touchpad with each button associated to specific classes of information or directional arrows to assist in the navigation of the Internet.

When an attempt to access World Wide Web information is made, the access device that initiated the attempt may take the form of one of many heterogeneous hardware and software configurations. Because the user interface is uniform across different configurations, selection of a key from the user interface is followed by the execution of a series of acts at the access device and/or at a server to ensure that the selected key accesses a specific class of information, regardless of the hardware or software configuration employed.

When a user selects a key from among the keys on the uniform interface, the selection is translated into a request for a specific class of information from the World Wide Web. The server receives the translated request, retrieves the specific class of information, and transmits the specific class of information to the access device.

One example of the configurations for the uniform interface is that of the touchpad on a touchtone telephone. This interface can also be used on a computer system where a representation of a similar touchpad is displayed on the computer system's video display. In operation, selecting the same key on the telephone touchpad or the representation of the touchpad displayed on the video display results in a request for the same class of information.

Software configures the keys by associating each key to specific classes of information. When the uniform interface is a touchtone telephone keypad, the software configures the input signals associated with the individual keys to request a specific class of information when one or more keys are depressed. Similarly, when the uniform interface is generated on a the computer system video display, the software correlates the keys on the displayed representation of the touchpad with specific classes of information. When the graphically displayed key is selected, by clicking it with the mouse or by depressing the associated key on the keyboard, the request for the specific class of information is generated.

The software can be configured so that similar or identical keys on the touchpad on the touchtone telephone and the graphically representation of the touchpad on the computer system video display request the same class of information. Thus, depressing the number "3" on the touchtone telephone touchpad and selecting "3" from the graphical representation of the touchpad on the computer system video display result in requests for the same class of information.

A significant benefit of the current invention is that a user can easily associate the classes of information with keys on a touchpad in any variety hardware or software configurations. Similar keys in different configurations request the same class of information. Thus the user is only required to learn one access method, which can be used on multiple platforms.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
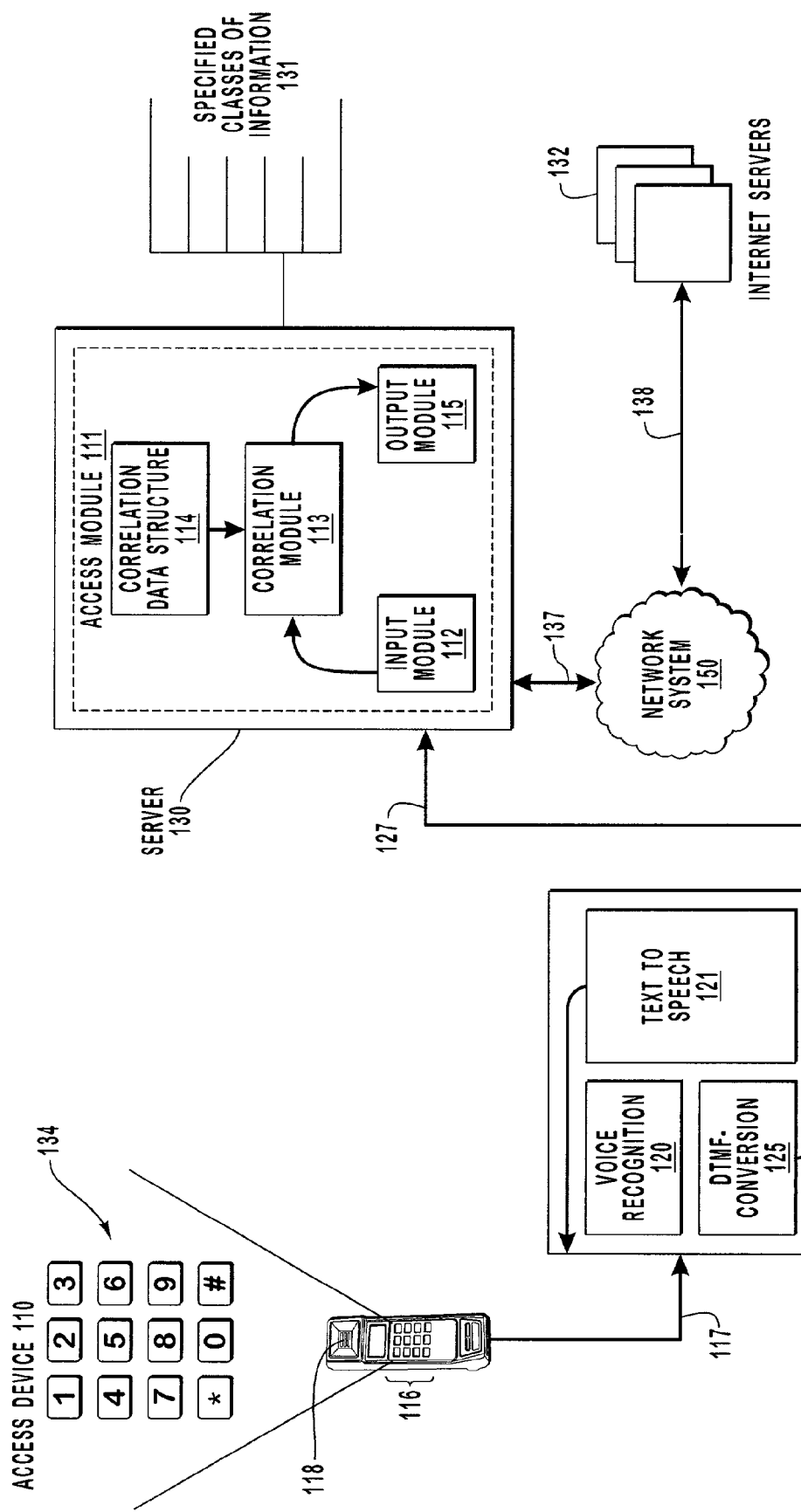
FIG. 1 illustrates an exemplary system that provides a suitable network operating environment for the present invention.

The present invention relates to methods and systems for providing access devices of differing hardware and software configurations with a uniform interface, which is used to request specified classes of information from a server. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

I. Telephone Interface

FIG. 1 illustrates a representative environment in which the method of the invention can be practiced. The environment includes access device 110, server 130, network system 150, and Internet servers 132. Although only one access device, server, and network system are illustrated in FIG. 1, the general principles disclosed herein can be readily adapted to an environment including more then one access device, server or network system. Server 130 is associated with network system 150 over communication link 137. Access device 110 is associated with voice browser 119 over communication link 117, which can be a standard telephone line, a communication link provided by a cellular service provider, etc. Voice browser 119 is in turn associated with server system 130 over communication link 127. Internet servers 132 are associated with network system 150 over communications link 138. Network system 150 can be Ethernet, token ring, Arcnet, or any other network, including the Internet, by which access device 110 and server 130 can communicate with Internet servers 132. Although the methods of accessing information according to the invention can be practiced with substantially any network system 150, the invention will be described herein below in the context of the Internet and the World Wide Web. It should be understood that the general principles described herein can be adapted for use with other network systems 150.

Access device 110 includes touchpad 116. Touchpad 116, by way of example, and not limitation, is a touchpad on a touchtone telephone or may be configured similarly thereto. Keys on a touchtone telephone touchpad, such as touchpad 116, may generate Dual Tone Multi-Frequency (DTMF)

signals. In a touchtone telephone that uses DTMF signals, each row and column of a touchpad is assigned a frequency, such that when a key is pressed the frequencies of the row and column associated with the key are used to generate a distinguishable signal for the key. Methods for generating DTMF signals are well known in the art. Access device 110 also includes audio speaker 118 by which the user of access device 110 receives information from the Internet or any other network represented by network system 150.

Voice browser 119 operates at a computer that is capable of engaging in communication with access device 110 by means of a telephone link and that is further capable of communicating with server 130 and Internet servers 132. Voice browser 119 includes voice recognition module 120, DTMF conversion module 125, and text to speech module 121. Voice recognition module 120 is capable of converting verbal commands into URI's or Hyper-Text Markup Language (HTML) code, while DTMF conversion module 125 is capable of converting audio tones (i.e., DTMF signals), which may be generated by pressing keys on touchpad 116, into URI's or HTML code. HTML code is an example of electronic content that is common to the Internet. However, the invention imposes no particular requirement on the type of audio signals received or the format of the code into which they are converted. Software that can be adapted for use as voice recognition module 120 and DTMF conversion module 125 is well known in the art.

Text to speech module 121 converts the text it receives to speech that can be communicated to the user of access device 110. In the embodiment in FIG. 1, text to speech module 121 converts HTML code into speech that can be transmitted to access device 110 and output on audio speaker 118. Software that can be adapted for use as text to speech module 121 is well known in the art.

A more detailed description of voice browser 119 and the associated techniques for enabling users to access the Internet and other networks using a telephone and voice browser is disclosed in U.S. patent application Ser. No. 09/464,989 entitled "VOICE INTERFACE FOR ELECTRONIC DOCUMENTS," filed, Dec. 16, 1999, which is incorporated herein by reference. The voice browser of the foregoing patent application can be used with the uniform interface of the invention to enable users to gain access to a wide variety of Internet information by telephone.

Server 130 is associated with specific classes of information 131. Information categorized under such classes can be stored on devices including, but not limited to, server 130, remote storage devices, other devices associated with network system 150 or any other device capable of storing data. Server 130 also includes access module 111, which associates HTML code and URIs, received from access devices (e.g. access device 110), with specified classes of information 131.

Access device 110, in combination with the network architecture illustrated in FIG. 1, enables a user to access selected Internet information by depressing the keys that have been correlated with specified classes of information and by listening to the Internet information that is converted from text to speech by text to speech module 121. The method of accessing information begins as a user of access device 110 establishes telephone communication with voice browser 119. The user of access device 110 can then specify a class of information that is desired by depressing one of the alpha-numeric keys 134 (e.g., keys 0-9,"*", and "#"). The user understands that each of the keys correlates to a specified class of information based, for example, on a template that can be overlaid on the keypad, prompts that are read to the user by voice browser 119, or familiarity with the interface from previous usage.

In one example of the use of the standardized or uniform interface embodied in the alphanumeric keys 134, the user may know or be informed that key "8" is associated with financial information from the Internet. If the user desires to access financial information, the user depresses the "8" key of access device, resulting in a DTMF signal being generated and transmitted to DTMF conversion module 125 of voice browser 119. DTMF conversion module 125 then converts the DTMF signal (i.e., the "8" signal) to HTML code or to a URI that is to be used by access module 111 of server 130 to access financial information from the Internet.

Input module 112 receives HTML code or the URI representing the "8" selection. Correlation module 113 correlates the HTML code or URI into one or more requests for specified classes of information. Correlation module 113 accesses correlation data structure 114 to identify, from among the classes of information 131, the particular class of information to which the "8" selection is correlated. Correlation data structure 114 includes data that associates the HTML code or URI for the "8" selection to the corresponding class of information. Based on the foregoing interaction between the various functional components of access module 111, correlation module 113 identifies a URI or another type of address associated with an HTML document that is correlated with the "8" selection made by the user of access device 110. Output module 115 then causes server 130 to service the request for the specified class of information by accessing the HTML document that has been requested.

The act of correlating a DTMF signal or the information generated based on the DTMF signal (e.g., HTML code, URI) with a specified class of information can be performed in any of a variety of ways other than that which is depicted in FIG. 1. For instance, voice browser 119, rather than access module 111, may include a correlation module 113 that is adapted for identifying the HTML document that is to be transmitted to voice browser 119 in response to the selection by the user of a particular key of access device 110. As used in this document, the term "user selection information" extends to a DTMF signal generated by an access device in response to the user selecting a key of the interface of access device 110, any HTML code or URI generated based on the DTMF signal, and the HTML code or URI generated in response to a user selecting a key on a graphically displayed version of the interface, as will be described in greater detail below.

The HTML document that is addressed by the URI identified by correlation module 113 may be located in a data storage device associated with server 130, or may be located on a remote Internet server 132. In either case, the appropriate HTML document is retrieved and transmitted to voice browser 119.

Server 130 transmits the specified class of information in the form of the HTML document. The transmitted HTML document travels over communication link 127 and is received by text to speech 121. Text to speech 121 parses the HTML code into text and links and converts the HTML code into audio signals, which include the content of the specified class of information. Access device 110 receives the audio signals and audio speaker 118 outputs the specified class of information.

II. Graphical Browser Interface

Figure 2:
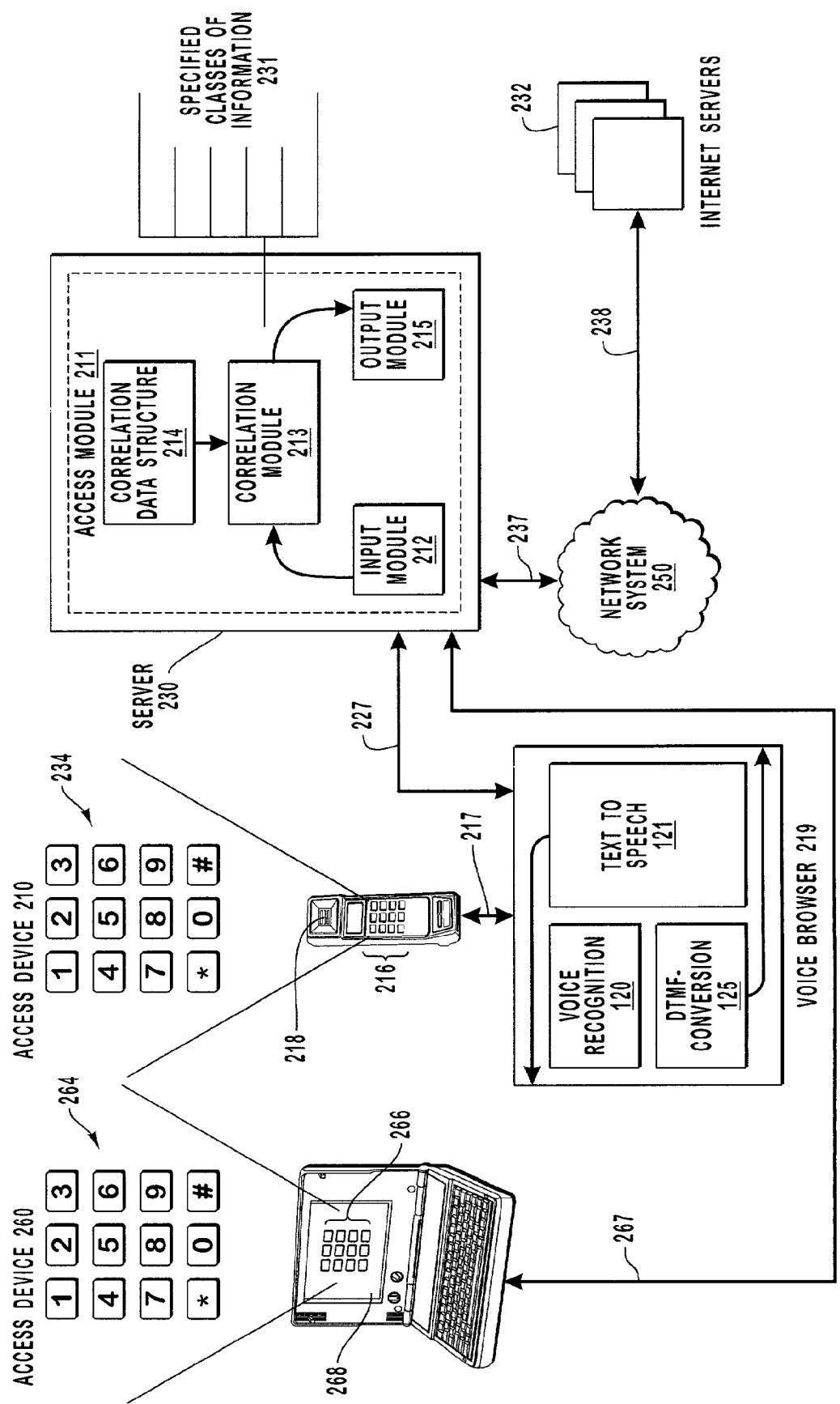
FIG. 2 illustrates an exemplary system that provides a suitable network operating environment for the present invention where multiple access devices are included.

FIG. 2 illustrates an embodiment of the invention including two access devices, access device 210 and access device 260. In this embodiment access device 210 is configured similarly to access device 110 in FIG. 1. Access device 210 includes touchpad 216. Touchpad 216, by way of example, and not limitation, is configured similarly to the touchpad on a touchtone telephone or may be configured similarly thereto. Additionally, voice browser 219 is configured similarly to voice browser 119 in FIG. 1.

Access device 260, is embedded in a computer system, as illustrated in FIG. 2, or in another electronics device, such as an Internet appliance or a personal digital assistant, having a graphical display device. Access device 260 includes video display 268, on which icon group 266 can be displayed, which is arranged similarly to touchpad 216.

Server 230 is configured similarly to server 130 in FIG. 1. Server 230 is associated with specified classes of information 231. Server 230 also includes access module 211. Access module 211 associates HTML source, received from access devices, with specified classes of information 231. Likewise, network system 250 may be any of the network types discussed in reference to network system 150.

In the embodiment in FIG. 2, access device 210 accesses information in a manner similar to access device 110 in FIG. 1. Voice Browser 219 converts an audio signal, such as a DTMF signal, into HTML code. The HTML code is transmitted over communications link 227 and received by server 230. Correlation module 213 correlates the HTML code to cause server 230 to send a specified class of information, also in the form of HTML code, to voice browser 219. Voice browser 219 then converts the HTML source to speech for output on audio speaker 218.

On access device 260, selection of icons from icon group 266 causes access device 260 to request a specific class of information. However, differing from access device 210, the request can be output directly in the form of HTML code or URIs. The HTML code or URIs are transmitted over communication link 267 and are received by server 230. Communications link 267 may be a standard telephone line, a connection to a LAN or WAN, a direct connection to network 250, or a virtual circuit or channel carried across network 250.

If access device 260 generates URIs associated with the requested class of information, server 230 merely services the request using the URI or transmits the request to network system 250, such that the request can be serviced by an appropriate Internet server 232. If access device instead generates a HTML code representing the particular key 2611 that has been selected by the user, server 230 and access module 211 process the HTML code to identify and obtain the corresponding class of information in a manner similar to that described above in reference to HTML code being received by access module 211 in response to input made using access device 210.

In particular, in the case in which access module 211 receives HTML code from access device 260 representing a particular key 264 that has been selected, input module 212 receives the HTML code. Correlation module 213 then correlates the HTML code into a request for a specified class of information. Correlation module 213 accesses correlation data structure 214 to identify the particular class of information that is correlated with the HTML code. Correlation data structure 214 includes data that associates HTML code to the specified classes of information. Output module 215 then causes server 230 to service the request for the specified class of information.

Server 230 then transmits information categorized under the specified class code class in the form of HTML code, over communication link 267. Access device 210 receives the HTML code, and information encoded therein is displayed in a visual format on video display 268.

FIG. 2 illustrates access device 260 and server 230 as distinct devices. However, this is not required; the invention may be practiced with access module 211 and its associated components included as part of access device 260. It may also be the case that the functional components of access module 211 interoperate with each other across one or more other devices included on network system 250 in addition to access device 260 and server 230. Moreover, the operations for correlating the key or icon selections with specified classes of information 231 can be performed in access device 260, a server 230, other networked devices or a combination of the foregoing.

A noteworthy feature of the embodiment of FIG. 2 is the ability of correlation module 213 to consistently correlate of similar HTML code and, accordingly, into the same specified similar key or icon selections, class of information. In this example, selecting the "3" icon from icon group 266 included in access device 260 results in a request for the same specified class of information as selecting "3" on touchpad 216 included on access device 210. While only two access devices are included in FIG. 2, any number of access devices can be operably configured to request the same specified class of information upon selection of a corresponding key or icon.

Figure 3:
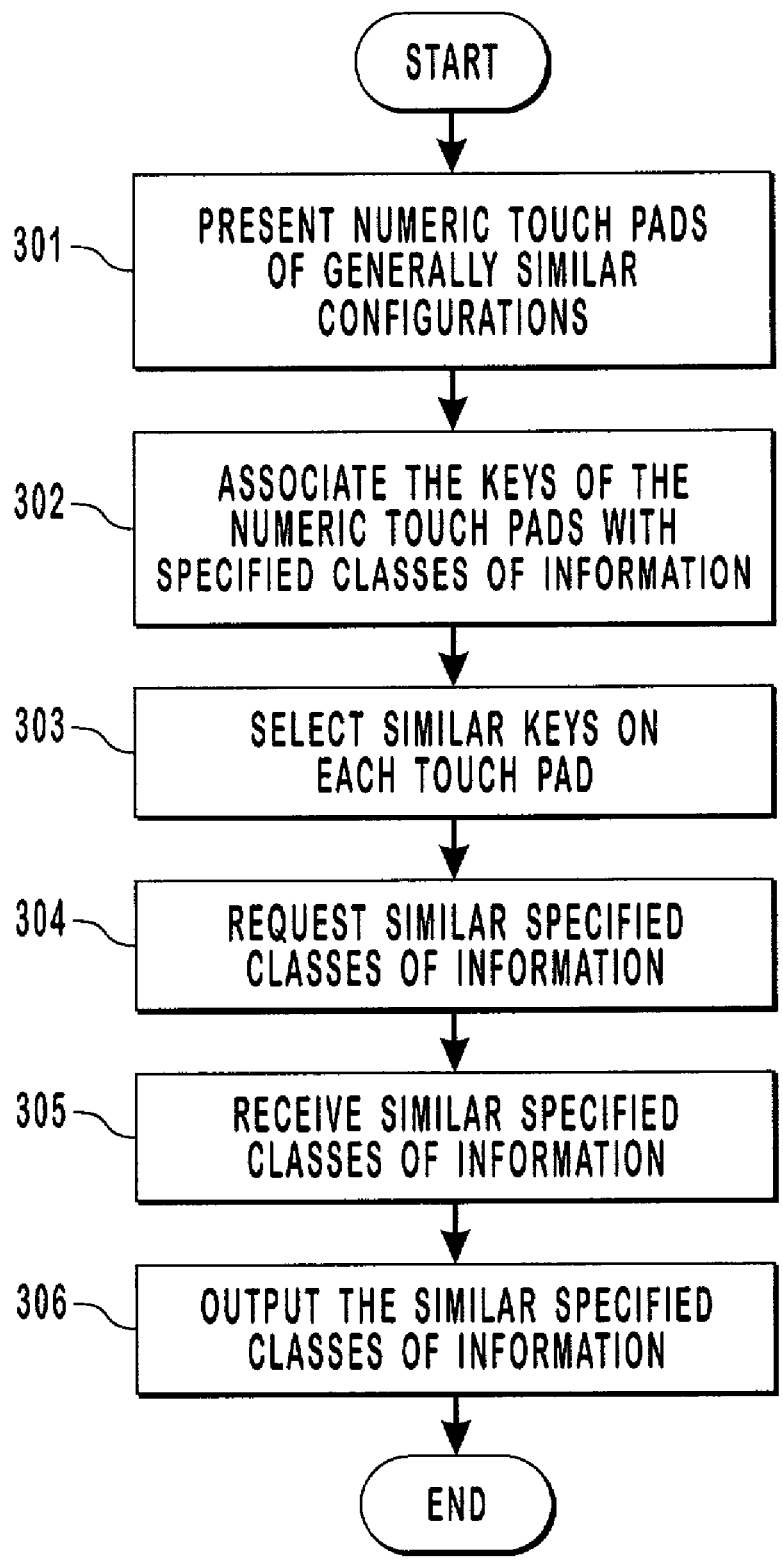
FIG. 3 is a flow diagram illustrating a method whereby different access devices use touchpads to request specified classes of information.

FIG. 2 further illustrates that access devices need not be similar. Access device 210 and access device 260 process different formats of input and output. Access device 210 processes audio requests while access device 260 processes the selection of icons on a video display. This is only one example of possible differences; there are a wide variety of differences between the types of access devices that can be used with the invention. The practice of the invention is not limited to any particular combination of differences The operation of the elements of FIG. 2 will now be described with respect to FIG. 3, which is a flowchart illustrating how two access devices, of differing configurations, access similar specified classes of information from a server. The method of FIG. 3 is illustrated to show how a user can perceive the appearance and response of the user interface of various access devices as being uniform. In act 301, both access device 210 and access device 260 present numeric touchpads with keys of generally similar configuration. In this example, access device 210 displays the keys as part of a touchtone telephone and access device 260 displays the keys as icons on video display 268.

In act 302, the keys of both the numeric touchpads are associated with specified classes of information. As seen in FIG. 2, associating the keys to specific classes of information can be done in different ways. The keys of access device 210 are associated with specific classes of information with the aid of voice browser 219 and/of access module 211. In contrast, the keys of access device 260 can be associated with specific classes of information using software operating on access device 260. As illustrated, associating the keys to specific classes of information can be performed on an access device or on other devices or modules in communication with an access device.

In act 303, similar keys from the numeric touchpad of access device 210 and access device 260 are selected. On access device 210, selections are performed by depressing a key on touchpad 216. On access device 260, selections are performed by selecting an icon from icon group 266. Ways to select an icon include, but are not limited to, using a mouse or other pointing device associated with access device 260 or depressing a key on a keyboard associated with access device 260.

In act 304, the selection of similar keys results in access device 210 and access device 260 requesting similar classes of specified information. The request of access device 260 is transmitted in the form of HTML code or a URI. The request of access device 210 request is transmitted as audio tones, (e.g., DTMF tones) which can be converted to HTML code by voice browser 219.

In steps 305, and 306 access device 210 and access device 260 receive the specified classes of information that have been requested. Access device 210 outputs the information as audio signals that have been converted form HTML code by voice browser 219. Access device 260 directly receives the HTML code and graphically displays the encoded information using a web browser.

III. Example of Classes of Information

Figure 4:
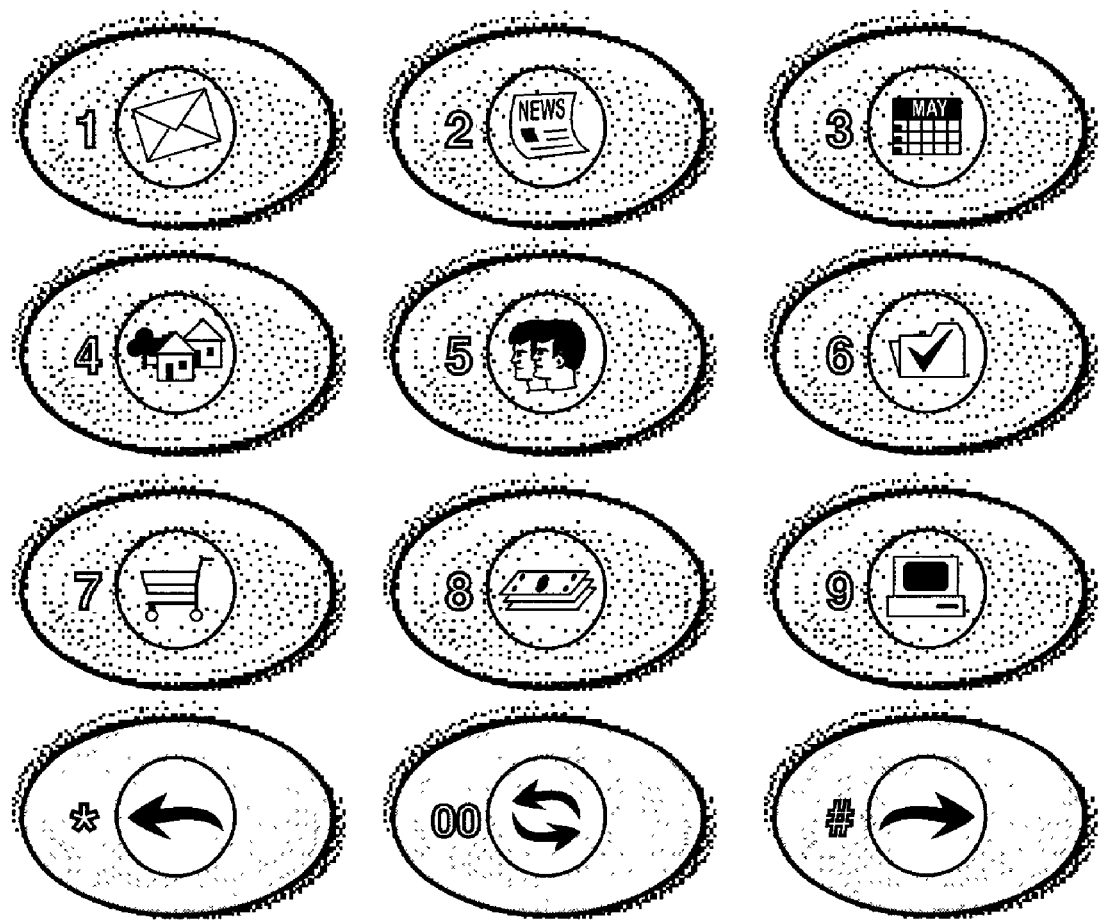
FIG. 4 is an exemplary representation of assigning the keys of a touchpad to specified classes of information.

FIG. 4 is an illustrative example of how particular icons and specified classes of information may be associated with the keys of an interface included in an access device. In this example, the arrangement of the interface is generally similar to that of a touchpad on a touchtone telephone. However, this arrangement is not required for practice of the invention, and the arrangement of the interface may have any of a number of other configurations. Additionally, the particular icons and content associated with the keys are not critical. A key may be associated with any specified class of information otherwise accessible by the access device. Any icon, including a variety of icons not included in FIG. 4, may be used to visually represent any specified class of information.

The interface in the example of FIG. 4 includes keys 0-9, *, and #. Each of the keys 1-9 is associated with a different specified class of information. Key 1 accesses unified messaging, including email, voice mail, fax, etc. Key 2 accesses a news center that can include links to specific Internet news sites. Key 3 accesses a calendar and personal scheduler. Key 4 accesses local information, such as weather, movie listings, etc. Key 5 accesses a content directory that has personalized address lists. This content directory can also include white pages, yellow pages, or other reference Internet sites. Key 6 is a general gateway to the Internet enabling the user to access any web page. Key 7 accesses an e-commerce site where a user may purchase a wide variety of goods and services online. Key 8 accesses a finance portal, which can have links to personalized financial information or financial Internet sites. Finally, key 9 accesses a desktop site, which can include personalized favorites or other such resources, The remaining three keys, namely *, 0, and # are directional arrows that correspond to buttons used by some graphical browsers. In this embodiment, the * key is a back button, the # key is a forward button, and the 0 key accesses help screens. However, setting keys *, 0, and # to directional arrows is not required, nor is setting the function they perform required. These keys may be set to access specified classes of information as keys 1-9 do, or set to perform other Internet functions including, but not limited to, stopping a currently incoming specified class of information, refreshing output of a specified class of information, returning to a home page, or any other Internet function that some graphical browsers may perform.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. A system for sending and receiving content from at least one server connected to a network, the system comprising:
    a server that requests specified classes of information from the at least one server connected to the network, the server including:
    an access module including:
    a correlation data structure; and
    a correlation module that correlates HTML code with specified classes of information using the correlation data structure;
    a first access device of a first type connected to said network, the first access device including an interface having a touchpad with a plurality of numbered keys that, when selected by a user, cause the first access device to generate a signal;
    a voice browser that converts the signal received from the first access device into HTML code that is transmitted to the access module, the voice browser being configured to convert the signal directly after the first access device generates the signal, wherein the correlation module of the access module uses the correlation data structure to correlate the HTML code with a request for a specified class of information, the server requesting the specified class of information from the at least one server;
    a second access device of a second type connected to said network, the second access device including an interface having an icon group arranged similarly to the touchpad such that the icon group and the touchpad present a uniform user interface, wherein an icon of the icon group, when selected by the user, causes the second access device to generate the HTML code that is correlated by the correlation module of the access module with the request for the specified class of information, the server requesting the specified class of information from the at least one server; and
    a computer-readable medium having stored thereon computer-executable instructions for associating the specified classes of information with particular keys of the plurality of keys and with particular icons of the icon group.

2. A system as recited in claim 1, wherein the first access device comprises a display device on which the user interface is displayed.

3. A system as recited in claim 1, wherein the request for the specified class of information is received by the server that services the request for the specified class of information.

4. A system as recited in claim 1, wherein the touchpad comprises an alphanumeric touchpad.

5. A system as recited in claim 1, wherein the first access device comprises a touchtone telephone including a numeric touchpad of a touchtone telephone, and wherein the second access device comprises a computer.

6. A system for sending and receiving content from at least one server connected to a network, the system comprising:
    a server having an access module that connects with the at least one server over a network, the access module comprising a correlation module that correlates a request with specified classes of information using a correlation data structure;

a first access device of a first type connected to said network through the access module, the first access device including:

an interface including a numeric touchpad, the numeric touchpad having a plurality of numbered keys that, when selected by the user, cause the first access device to generate a signal associated with specified classes of information from the at least one server; and an output device for outputting the specified classes of information that the first access device receives;

a voice browser that converts the signal generated by the first access device into a request for the specified classes of information from the at least one server, the voice browser being configured to convert the signal directly after the first access device generates the signal, the voice browser transmitting the request to the access module;

a second access device of a second type connected to said network through the access module, the second access device having an icon group arranged similarly to the numeric touchpad of the first access device such that the numeric touchpad and the icon group present a uniform user interface, wherein an icon of the icon group, when selected by the user, causes the second access device to request the specified classes of information from the access module; and a computer-readable medium at the access module, the computer-readable medium having stored thereon computer-executable instructions for associating the specified classes of information with particular keys of the plurality of keys and with particular icons of the icon group.

7. A system as recited in claim 6, wherein the interface of the first access device comprises a display device, wherein the display device is capable of displaying the numeric touchpad.

8. A system as recited in claim 6, wherein the icon group is generated by the at least one server.

9. A system as recited in claim 6, wherein the output device comprises a video display device.

10. A system as recited in claim 6, wherein the output device comprises an audio speaker device.

11. A system as recited in claim 6, wherein the second access device comprises a computer system.

12. In one or more access devices that are connected to a network by a one or more communication links, a method of providing an access device with access to information stored at at least one server, the method comprising:

receiving a request from at least one of a first access device and a second access device, wherein the first access device has a first numeric touchpad that generates a first signal in response to selection of a particular key on the numeric touchpad and the second access device includes a representation of the first numeric touchpad that generates HTML code in response to a particular icon included in the representation of the first numeric touchpad, wherein the first numeric touchpad and the representation of the first numeric touchpad present a uniform user interface;

converting the first signal into the HTML code if the first access device does not automatically generate the HTML code, the first signal being converted directly after the first numeric touchpad generates the signal;

identifying a specified class of information associated with the selected key on the first numeric touchpad and with the particular icon in the representation of the first numeric touchpad by correlating the HTML code with the specified class of information; and transmitting a request for the specified class of information to the at least one server.

13. A method as recited in claim 12, wherein the second access device comprises a video display device.

14. A method as recited in claim 13, wherein displaying the interface to the user comprises displaying the keys of the first numeric keypad on the video display device.

15. A method as recited in claim 14, wherein said second access device comprises a pointing device capable of selecting a particular key of the first numeric touchpad.

16. A method as recited in claim 12, wherein receiving input in response to a selection of a particular key on the first numeric keypad comprises depressing the particular key on the numeric keypad.

17. A method as recited in claim 12, wherein transmitting a request for the specified class of information to the at least one server comprises transmitting the request over the network system.

18. A method as recited in claim 12, wherein the access device comprises a computer system.

19. A system for sending and receiving content from at least one server connected to a network, the system comprising:

a voice browser that receives a signal from a first access device that includes a touchpad with a plurality of keys that, when selected by a user, cause the access device to generate the signal, the voice browser converting the signal into an HTML code for a specified class of information from the at least one server, the voice browser being configured to convert the signal directly after the first access device generates the signal; and a server having an access module that connects with at least one of the voice browser and with a second access device of a second type, the second access device having an icon group arranged similarly to the touchpad such that the touchpad and the icon group present a uniform user interface, wherein an icon of the icon group, when selected by the user, causes the second access device to generate the HTML code for the specified class of information from the at least one server; and wherein the access module receives the HTML code from at least one of the voice browser and the second access device, the access module accessing the specified class of information associated with a particular key or a particular icon selected by the user using a correlation data structure to correlate the HTML code with the specified class of information, the access module requesting the specified class of information from the at least one server over the network.

20. A system as defined in claim 19, wherein the second access device is a computer and the icon group is configured to represent the touchpad of the first access device.

21. A system as defined in claim 20, wherein the first access device is a telephone and the signal generated by the access device is a dual tone multi-frequency signal.

22. A system as defined in claim 19, wherein the second access device further comprises a display for displaying a response from the access module.

23. A system as defined in claim 19, wherein the access module returns HTML code to the voice browser in response to the request for the specified class of information and the voice browser converts the HTML code into speech with a text to speech module.

24. A system as defined in claim 23, wherein the first access device further comprises an audio output for delivering the speech.

25. A computer program product for implementing a method of providing one or more access devices with access to specific classes of information stored on at least one server, the computer program product comprising:
- a computer-readable medium carrying computer-executable instructions for implementing the method, the method comprising:
  - receiving input selecting a particular key of a numeric touchpad of a first access device or from a particular icon of an icon group displayed on a second access device, wherein the icon group is configured to resemble the numeric touchpad such that the numeric touchpad and the icon group present a uniform user interface;
  - converting the input from the first access device into an HTML code using a voice browser, wherein the input is at least one of a voice command and a DTMF tone, wherein the second access device generates the HTML code, the input being converted directly after the first access device generates the signal;
  - identifying a specific class of information from the HTML code using a correlation data structure, wherein the specific class of information is associated with both the particular key of the first access device and with the particular icon of the second access device; and
- transmitting the HTML code to a server for the specific class of information device.

* * * * *